A. L. Rand,
Wine Press.

Nº 70,468.         Patented Nov. 5, 1867.

Witnesses:   Fig. 3.                 Inventor:
Geo. H. Griebel                A. L. Rand
P. T. Dodge                  by Dodge & Munn
                                           his attys

AM. PHOTO-LITHO. CO. N.Y. (OSBORNE'S PROCESS)

United States Patent Office.

A. L. RAND, OF PEORIA, ILLINOIS.

Letters Patent No. 70,468, dated November 5, 1867.

---

IMPROVED WINE-PRESS.

---

The Schedule referred to in these Letters Patent and making part of the same.

---

TO ALL WHOM IT MAY CONCERN:

Be it known that I, A. L. RAND, of Peoria, in the county of Peoria, and State of Illinois, have invented certain new and useful Improvements in Wine-Presses, on my press patented January 23, 1866; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to presses for domestic or household uses, and consists of important improvements in the press for which Letters Patent No. 52,202 were granted me the 23d day of January, 1866. In the drawings—

Figure 3 is a view of a part detached.

Figure 1:
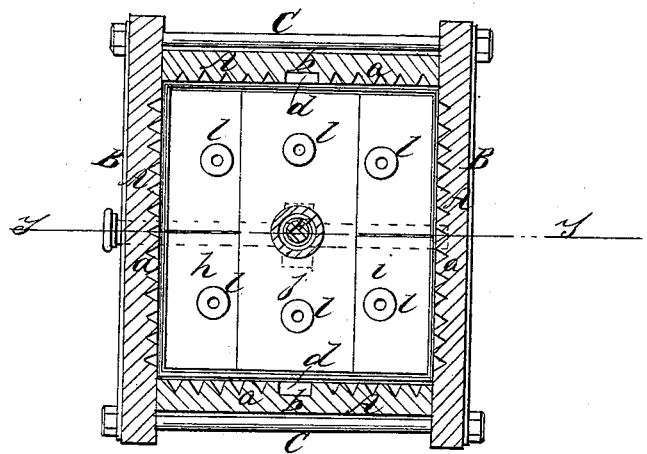
Figure 1 is a view of a horizontal section on the line $x$–$x$ of fig. 2.
Figure 2:
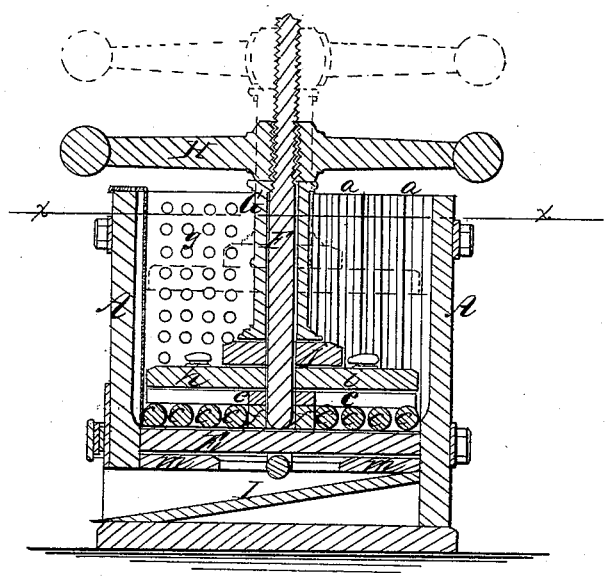
Figure 2 is a view of a vertical section on the line $y$–$y$ of fig. 1.
Figure 2:
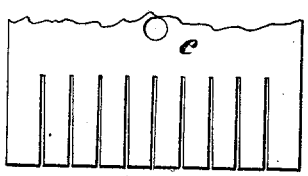

In constructing my press I first make a square box, A, of wood, and of any size desired, with two of its opposite sides extending a little beyond the intermediate sides, as shown in fig. 1. The box A, I make very strong by placing iron plates B along the extending sides, and fasten them by means of iron bolts, C, passing through their ends and along the intermediate sides, as shown in fig. 1. The upper side of the box A, I leave open, and cut V-shaped grooves $a$ vertically on its interior sides, and extend them down about two-thirds of the distance from the top of the box A to the bottom. In two of the opposites of the interior of the box I cut two rectangular grooves, $b$, and extend them down a little further than the V-shaped grooves $a$, when they enter transverse grooves in the sides of the box A, which are sufficiently large to admit a series of rollers, $c$, which extend across the box A. The rollers $c$ I put in place by sliding them down the rectangular grooves $b$ till they come to the transverse grooves, and then slide them out to the right and left in the transverse grooves, as shown in fig. 2, and in my former patent. When in place I insert slides into the rectangular grooves $d$. Through a hole in the side of the box A, I insert a strong rod, E, just below the rollers $c$, in a horizontal position, and with its inner end having its bearing in a hole in the opposite side of the box A. This rod E, I pass through the eye of another rod, F, which stands in a vertical position, and has its upper end provided with a screw-thread, as shown in fig. 2. Over the end of the rod F, I pass a lifting-plate, $e$. This lifting-plate $e$ I make of wood, and large enough to fit easily the interior of the box A, and with its ends sawed in, as shown in fig. 3, and with a cross-piece, $f$, fastened to its under side for the purpose of strengthening it, as shown in fig. 2. That portion of the interior of the box A provided with the V-shaped grooves $a$, I cover with perforated metallic plates $g$. These plates $g$ rest against the V-shaped grooves $a$, and have their upper edges turned over, so as to catch upon the upper sides of the box A, and be held in position. On the vertical rod F, I place three or more blocks, $h$ $i$ $j$, as followers. The two blocks $h$ and $i$ are made to fill up the whole interior of the box A, and the other block $j$ is placed across them transversely, as shown in fig. 1. These blocks or followers $h$ $i$ $j$ I provide with knobs, $l$, for convenience in lifting them out. On the vertical rod F, and above the followers $h$ $i$ $j$, I place the tubular column G, with its base resting on the followers, and above the tubular column G, I screw on the lever H, as shown in fig. 2. Under the rod E, I place a drip-board, $m$, so as to extend over about one-third or one-half of the space between the sides of the box, as shown in fig. 2, and with its under side scored, so that the liquid cannot run back or down the sides of the press. Below the drip-board $m$, and in the lower part of the press, I place an inclined chute, I. This chute I, I make with its sides inclined towards each other at the front, where the liquid is delivered, so as to be easily caught in any receptacle used for the purpose.

In operating my press I remove the lever H, tubular column G, and followers $h$ $i$ $j$, and place the rollers $c$, lifting-plate $e$, and perforated metallic plates $g$, in position, as shown and described. I then place the articles to be pressed, whether grapes, currants, berries, &c., in the box, upon the lifting-plate $e$, then put on the followers $h$ $i$ $j$, the tubular column G, and lever H. This done, I apply the pressure by turning the lever H, when the liquid will pass through the metallic perforated plates $g$, and down the V-shaped grooves $a$, as well as through the lifting-plate $e$, and then through the rollers $c$, and on through the drip-board $m$, and on to the inclined chute I, and so out. When the pressing is completed, by pulling out the rod E, and releasing the rod F, all of the different parts forming the interior structure may be removed or taken out, and the press cleaned and prepared for another operation. In this way I am able to make certain improvements in my press, rendering it simpler, cheaper, and more convenient for general use.

Having thus described my invention, what I claim, is—

1. The box A provided with the perforated plates $g$, lifting-plate $e$, and dripping-board $m$, and inclined chute I, when constructed and arranged to operate substantially as described and for the purpose set forth.

2. The screw-rod F, in combination with the tubular column G, lifting-plate $e$, followers $h\ i\ j$, lever H, and rod E, when constructed and arranged to operate substantially as described and for the purposes set forth.

A. L. RAND.

Witnesses:
L. A. LAPHAM,
J. S. STEVENS.